A. HOFACKER.
SLEIGH ATTACHMENT FOR VEHICLES.
APPLICATION FILED MAY 16, 1911.
1,005,215.
Patented Oct. 10, 1911.
2 SHEETS—SHEET 1.
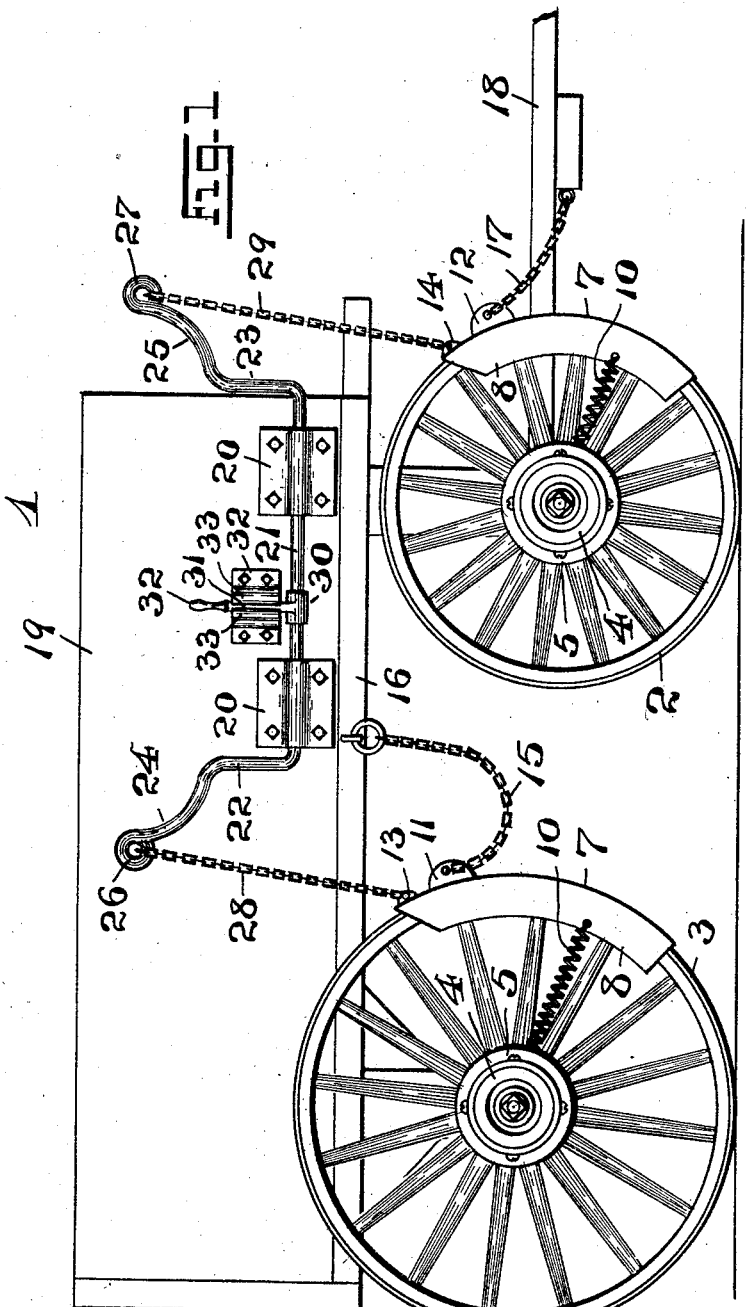
WITNESSES:
Harry E. Pfiffer
Fredk. H. W. Fraentzel
INVENTOR:
Anton Hofacker,
BY Fraentzel and Richards,
ATTORNEYS

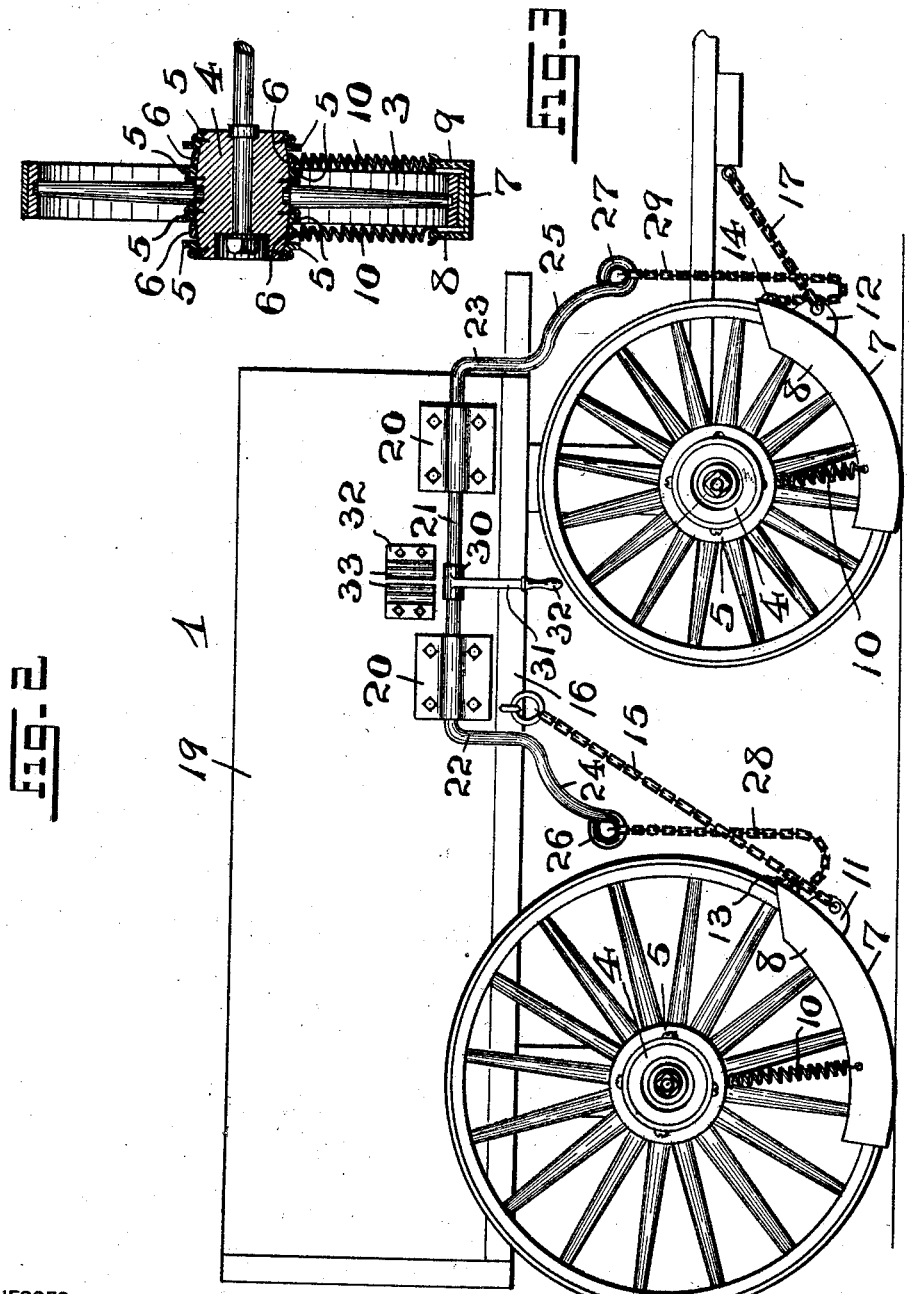

UNITED STATES PATENT OFFICE.

ANTON HOFACKER, OF NEWARK, NEW JERSEY.

SLEIGH ATTACHMENT FOR VEHICLES.

1,005,215. Specification of Letters Patent. Patented Oct. 10, 1911.

Application filed May 16, 1911. Serial No. 627,417.

*To all whom it may concern:*

Be it known that I, ANTON HOFACKER, a citizen of the United States, residing at Newark, in the county of Essex and State of New Jersey, have invented certain new and useful Improvements in Sleigh Attachments for Vehicles; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention has reference, generally, to improvements in sleigh-attachments for wheeled vehicles; and, the present invention relates, more particularly, to a novel attachment for wheeled vehicles of the various kinds, which can be readily operated by a person seated in the vehicle, to bring the attachment into its proper relation with the wheels of the vehicle, so as to turn the vehicle into a sleigh.

The principal object of the present invention, therefore, is to provide a novel and simply constructed, as well as a quickly and readily manipulated sleigh or runner attachment for the wheels of vehicles, whereby a wagon or similar vehicle can be easily turned into a sleigh; and, furthermore, the duplicate devices and mechanism, embodying the principles of the present invention being arranged upon both sides of the vehicle and being adapted to be operated separately and independently, so that the vehicle may be turned upon one side into a sleigh-runner, while upon the other side of the vehicle the wheels are used in the usual manner, or vice versa, as occasion may require.

The invention has for its further object to provide an attachment for the wheels of vehicles which, while it is primarily intended for use as a runner or sleigh-attachment, may also be used as a wagon-brake or drag for controlling the momentum of the vehicle in descending hills and steep inclines.

Other objects of this invention not at this time more particularly enumerated will be clearly understood from the following detailed description of the present invention.

With the various objects of this invention in view, the said invention consists, primarily, in the novel arrangements and combinations of the devices and parts, as well as in the details of the construction of the said parts, as described in detail in the following specification, and then finally embodied in the clauses of the claim which are appended to and which form an essential part of this specification.

The invention is clearly illustrated in the accompanying drawings, in which:—

Figure 1 is a side elevation of a vehicle provided with a sleigh-attachment constructed in accordance with the principles of the present invention, the runners being shown in their raised relations with the wheels; Fig. 2 is a similar view of the vehicle, but showing the runners of the sleigh attachment in their lowered and operative relations with the wheels; and Fig. 3 is a transverse vertical sectional representation of one of the wheels of the vehicle and a runner of the sleigh-attachment.

Similar characters of reference are employed in all of the above described views, to indicate corresponding parts.

Referring now to the said drawings, the reference-character 1 indicates a vehicle, 2 are the front wheels, and 3 the rear wheels of the same. As illustrated more particularly in Fig. 3 of the drawings, the hubs 4 of the respective wheels are encircled and have suitably secured thereto a series of ring-shaped elements, as 5, which are preferably L-shape in cross-section, and serve as guides and retainers for the movable arrangement in the spaces between each pair of such guides, of suitable rings 6, the purposes of which will be presently more fully described.

Movably arranged upon the peripheral portions of each front wheel 2 and each rear wheel 3, so as not to interfere with the revolving movements of the wheels, is a segmental runner 7, made of metal or any other suitable material, each runner being provided with the side-flanges 8 and 9 which extend partly up the sides of the wheels, as shown more particularly in Fig. 3 of the drawings. Suitable springs, as 10, are connected at one of their ends with the said flanges and at their other ends the said springs are attached to the herein-above mentioned rings 6 which are loosely and movably mounted upon the hubs of the wheels of the vehicle.

As shown, the runners upon the rear wheels 3 of the vehicle are provided with eyes 11 and 13, and the runners upon the front wheels 2 are provided with eyes 12 and 14. Chains or other suitable flexible connections, as 15, are attached to the eyes 11 and to the body 16 of vehicle, and chains or other flexible connections, as 17, are similarly attached to the eyes 12 and to the shafts 18, or other suitable part of the vehicle. Suitably secured to the sides 19 of the vehicle are bearings 20, in which is oscillatorily mounted, upon each side of the vehicle, a rod 21, said rods being made with upwardly extending portions 22 and 23, and the respective rearwardly and forwardly extending members 24 and 25, respectively, provided at their free end-portions with the eyes 26 and 27, or other suitably formed fastening means.

Chains or other suitable flexible connections, as 28, are attached to the eyes 13 and 26, and, likewise, chains or other suitable flexible connections, as 29, are attached to the eyes 14 and 27. Rigidly mounted and secured upon each rod 21 is a hub, as 30, provided with an upwardly extending and preferably flat arm 31, each arm being provided upon its free end-portion with a handle 32, for the manipulation of each rod 21.

In order to maintain the several devices in their raised relations, indicated in said Fig. 1 of the drawings, each side 19 of the vehicle is provided with a suitably constructed clamping device 32, each device having a pair of outwardly extending spring-like clamping members 33 between which the flat arms 31 can be forced and are detachably held by their frictional engagement with the said members 33, substantially as shown and as will be clearly understood from an inspection of said Fig. 1 of the drawings.

When the several parts are in the positions shown in said Fig. 1, the chains or flexible connections 28 and 29 are pulled taut, and the runners are in their raised positions, so that the wheels of the vehicle are free to revolve. When, however, the arms 31 are disconnected or disengaged from their frictional holding engagement with the clamping members 33, the rods 21 will move into the position indicated in Fig. 2 of the drawings, whereby the runners are lowered and the wheels will ride directly upon said runners until the chains or flexible connections 15 and 17 are held taut, thus providing a suitable sleigh-attachment or drag or brake for each wheel which prevents its turning, as will be clearly evident.

It will be understood that the devices upon the opposite sides of the vehicle can be operated independently from each other, so that but one side of the vehicle may be used as a sleigh attachment, while the other side of the vehicle is running upon its wheels; or, both of the sleigh-attachments may be lowered, so that both sides of the vehicle are moving upon sleigh-runners; or, by raising said runners, the vehicle may move upon its wheels in the usual manner.

I am aware, that some changes may be made in the general arrangements and combinations of the devices and parts, as well as in the details of the construction of the same, without departing from the scope of the present invention as set forth in the foregoing specification, and as defined in the claims which are appended thereto. Hence, I do not limit my present invention to the exact arrangements and combinations of the devices and parts as described in the said specification, nor do I confine myself to the exact details of the construction of the said parts as illustrated in the accompanying drawings.

I claim:—

1. In a sleigh-attachment for wheeled vehicles, the combination with the body and wheels of a vehicle, of an oscillatory rod upon the side of the body of the vehicle, means for manipulating said rod, segmental runners movably arranged with relation to the tires of the wheels of the vehicle, flexible connections between said runners and said rod for raising and lowering the runners, and other flexible connections between said runners and portions of the vehicle, guides encircling each hub of the wheels of the vehicle, rings loosely mounted upon each hub between said guides, and springs between said rings and said runners, substantially as and for the purposes set forth.

2. In a sleigh-attachment for wheeled vehicles, the combination with the body and wheels of a vehicle, of an oscillatory rod upon the side of the vehicle, an arm mounted upon said rod, said arm being provided with a handle, a clamping device secured upon the side of the vehicle, and a pair of clamping members connected with said device with which the said arm can be brought into detachable holding engagement, segmental runners movably arranged with relation to the tires of the wheels of the vehicle, flexible connections between said runners and said rod for raising and lowering the runners, and other flexible connections between said runners and portions of the vehicle, guides encircling each hub of the wheels of the vehicle, rings loosely mounted upon each hub between said guides, and springs between said rings and said runners, substantially as and for the purposes set forth.

3. In a sleigh-attachment for wheeled vehicles, the combination with the body and wheels of a vehicle, of an oscillatory rod upon the side of the vehicle, an arm mounted upon said rod, said arm being provided with a handle, a clamping device secured upon the side of the vehicle, and a pair of clamping members connected with said device with which the said arm can be brought into detachable holding engagement, segmental runners movably arranged with relation to the tires of the wheels of the vehicle, said runners being provided with flanges which extend partway up the sides of the wheels, flexible connections between said runners and said rod for raising and lowering the runners, and other flexible connections between said runners and portions of the vehicle, guides encircling each hub of the wheels of the vehicle, rings loosely mounted upon each hub between said guides, and springs between said rings and the flanges of said runners, substantially as and for the purposes set forth.

In testimony, that I claim the invention set forth above I have hereunto set my hand this twelfth day of May, 1911.

ANTON HOFACKER.

Witnesses:
FREDK. C. FRAENTZEL,
FREDK. H. W. FRAENTZEL.

---

Copies of this patent may be obtained for five cents each, by addressing the "Commissioner of Patents, Washington, D. C."